(12) United States Patent
Wolf

(10) Patent No.: US 9,802,609 B2
(45) Date of Patent: Oct. 31, 2017

(54) COLLISION AVOIDANCE SYSTEM FOR VEHICLE

(71) Applicant: MAGNA ELECTRONICS INC., Auburn Hills, MI (US)

(72) Inventor: Johannes Wolf, Aschaffenburg (DE)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 0 days.

(21) Appl. No.: 15/406,861

(22) Filed: Jan. 16, 2017

(65) Prior Publication Data

US 2017/0120907 A1    May 4, 2017

Related U.S. Application Data

(63) Continuation of application No. 15/144,114, filed on May 2, 2016, now Pat. No. 9,545,921, which is a
(Continued)

(51) Int. Cl.
*A01B 69/00* (2006.01)
*B62D 6/00* (2006.01)
(Continued)

(52) U.S. Cl.
CPC ............. *B60W 30/09* (2013.01); *B60R 1/00* (2013.01); *B60T 7/22* (2013.01); *B60T 8/17* (2013.01);
(Continued)

(58) Field of Classification Search
CPC .... B60W 30/09; B60W 10/04; B60W 10/184; B60W 10/30; B60W 10/20; B60W 10/18;
(Continued)

(56) References Cited

U.S. PATENT DOCUMENTS

| 4,720,790 A | 1/1988 | Miki et al. |
| 4,987,357 A | 1/1991 | Masaki |

(Continued)

FOREIGN PATENT DOCUMENTS

EP    0927983    7/1999

*Primary Examiner* — Jaime Figueroa
(74) *Attorney, Agent, or Firm* — Gardner, Linn, Burkhart & Flory, LLP

(57) ABSTRACT

A vehicular collision avoidance system includes a first image processor that processes image data captured by a forward-viewing camera to detect vehicles and determine vehicles present in the occupied lane and adjacent lane, and a second image processor that processes image data captured by a rearward-viewing camera to detect the presence of vehicles and determine vehicles present in the occupied lane and adjacent lane. Information relating to the vehicles is wirelessly transmitted between the vehicles. Responsive at least in part to at least one of (i) image processing of image data captured by the forward-viewing camera and/or rearward-viewing camera, (ii) sensor data sensed by at least one other sensor, and (iii) information transmitted to or from the equipped vehicle via the car2car (v2v) communication system, the collision avoidance system is operable to determine imminence of collision with the equipped vehicle by another vehicle present exterior the equipped vehicle.

43 Claims, 3 Drawing Sheets

Related U.S. Application Data continuation of application No. 14/248,602, filed on Apr. 9, 2014, now Pat. No. 9,327,693.

(60) Provisional application No. 61/810,407, filed on Apr. 10, 2013.

(51) Int. Cl.

| | | |
|---|---|---|
| *B62D 11/00* | (2006.01) | |
| *B62D 12/00* | (2006.01) | |
| *B63G 8/20* | (2006.01) | |
| *B63H 25/04* | (2006.01) | |
| *G05D 1/00* | (2006.01) | |
| *G06F 7/00* | (2006.01) | |
| *G06F 17/00* | (2006.01) | |
| *G06F 19/00* | (2011.01) | |
| *B60W 30/09* | (2012.01) | |
| *B60T 8/17* | (2006.01) | |
| *B62D 15/02* | (2006.01) | |
| *B60W 30/08* | (2012.01) | |
| *B60R 1/00* | (2006.01) | |
| *B60T 7/22* | (2006.01) | |
| *G08G 1/16* | (2006.01) | |
| *B60W 10/18* | (2012.01) | |
| *B60W 10/20* | (2006.01) | |
| *B60W 10/30* | (2006.01) | |
| *B60W 30/095* | (2012.01) | |
| *G06K 9/00* | (2006.01) | |
| *B60W 10/04* | (2006.01) | |
| *B60W 10/184* | (2012.01) | |
| *G05D 1/02* | (2006.01) | |

(52) U.S. Cl.
CPC ............ *B60W 10/04* (2013.01); *B60W 10/18* (2013.01); *B60W 10/184* (2013.01); *B60W 10/20* (2013.01); *B60W 10/30* (2013.01); *B60W 30/08* (2013.01); *B60W 30/0953* (2013.01); *B62D 6/002* (2013.01); *B62D 15/0265* (2013.01); *G05D 1/0214* (2013.01); *G06K 9/00805* (2013.01); *G08G 1/16* (2013.01); *G08G 1/166* (2013.01); *B60R 2300/70* (2013.01); *B60R 2300/806* (2013.01); *B60R 2300/8026* (2013.01); *B60T 2201/024* (2013.01); *B60W 2420/42* (2013.01); *B60W 2420/52* (2013.01); *B60W 2550/30* (2013.01); *B60W 2710/18* (2013.01); *B60W 2710/20* (2013.01); *B60W 2710/30* (2013.01); *G05D 2201/0213* (2013.01)

(58) Field of Classification Search
CPC ............ B60W 30/0953; B60W 30/08; B60W 2420/52; B60W 2420/42; B60W 2710/18; B60W 2710/20; B60W 2710/30; B60W 2550/30; G05D 1/0214; G05D 2201/0213; G06K 9/00805; G08G 1/16; G08G 1/166; B60T 7/22; B60T 8/17; B60T 2201/024; B60R 1/00; B60R 2300/806; B60R 2300/70; B60R 2300/8026; B62D 15/0265; B62D 6/002
USPC ...... 701/1, 2, 23, 24, 26, 28, 36, 41, 45, 70, 701/442, 300, 301, 302; 340/905, 435, 340/436, 903, 902
See application file for complete search history.

(56) References Cited

U.S. PATENT DOCUMENTS

| | | |
|---|---|---|
| 4,991,054 A | 2/1991 | Walters |
| 5,001,558 A | 3/1991 | Burley et al. |
| 5,003,288 A | 3/1991 | Wilhelm |
| 5,012,082 A | 4/1991 | Watanabe |
| 5,016,977 A | 5/1991 | Baude et al. |
| 5,027,001 A | 6/1991 | Torbert |
| 5,027,200 A | 6/1991 | Petrossian et al. |
| 5,044,706 A | 9/1991 | Chen |
| 5,055,668 A | 10/1991 | French |
| 5,059,877 A | 10/1991 | Teder |
| 5,064,274 A | 11/1991 | Alten |
| 5,072,154 A | 12/1991 | Chen |
| 5,073,012 A | 12/1991 | Lynam |
| 5,076,673 A | 12/1991 | Lynam et al. |
| 5,086,253 A | 2/1992 | Lawler |
| 5,096,287 A | 3/1992 | Kakinami et al. |
| 5,097,362 A | 3/1992 | Lynas |
| 5,115,346 A | 5/1992 | Lynam |
| 5,121,200 A | 6/1992 | Choi |
| 5,124,549 A | 6/1992 | Michaels et al. |
| 5,130,709 A | 7/1992 | Toyama et al. |
| 5,148,014 A | 9/1992 | Lynam |
| 5,151,816 A | 9/1992 | Varaprasad et al. |
| 5,168,378 A | 12/1992 | Black |
| 5,170,374 A | 12/1992 | Shimohigashi et al. |
| 5,172,235 A | 12/1992 | Wilm et al. |
| 5,177,685 A | 1/1993 | Davis et al. |
| 5,182,502 A | 1/1993 | Slotkowski et al. |
| 5,184,956 A | 2/1993 | Langlais et al. |
| 5,189,561 A | 2/1993 | Hong |
| 5,193,000 A | 3/1993 | Lipton et al. |
| 5,193,029 A | 3/1993 | Schofield |
| 5,204,778 A | 4/1993 | Bechtel |
| 5,208,701 A | 5/1993 | Maeda |
| 5,245,422 A | 9/1993 | Borcherts et al. |
| 5,253,109 A | 10/1993 | O'Farrell |
| 5,255,442 A | 10/1993 | Schierbeek et al. |
| 5,276,389 A | 1/1994 | Levers |
| 5,285,060 A | 2/1994 | Larson et al. |
| 5,289,182 A | 2/1994 | Brillard et al. |
| 5,289,321 A | 2/1994 | Secor |
| 5,305,012 A | 4/1994 | Faris |
| 5,307,136 A | 4/1994 | Saneyoshi |
| 5,309,137 A | 5/1994 | Kajiwara |
| 5,313,072 A | 5/1994 | Vachss |
| 5,325,096 A | 6/1994 | Pakett |
| 5,325,386 A | 6/1994 | Jewell et al. |
| 5,329,206 A | 7/1994 | Slotkowski et al. |
| 5,331,312 A | 7/1994 | Kudoh |
| 5,336,980 A | 8/1994 | Levers |
| 5,341,437 A | 8/1994 | Nakayama |
| 5,351,044 A | 9/1994 | Mathur et al. |
| 5,355,118 A | 10/1994 | Fukuhara |
| 5,374,852 A | 12/1994 | Parkes |
| 5,386,285 A | 1/1995 | Asayama |
| 5,394,333 A | 2/1995 | Kao |
| 5,406,395 A | 4/1995 | Wilson et al. |
| 5,406,414 A | 4/1995 | O'Farrell et al. |
| 5,410,346 A | 4/1995 | Saneyoshi et al. |
| 5,414,257 A | 5/1995 | Stanton |
| 5,414,461 A | 5/1995 | Kishi et al. |
| 5,416,313 A | 5/1995 | Larson et al. |
| 5,416,318 A | 5/1995 | Hegyi |
| 5,416,478 A | 5/1995 | Morinaga |
| 5,424,952 A | 6/1995 | Asayama |
| 5,426,294 A | 6/1995 | Kobayashi et al. |
| 5,430,431 A | 7/1995 | Nelson |
| 5,434,407 A | 7/1995 | Bauer et al. |
| 5,440,428 A | 8/1995 | Hegg et al. |
| 5,444,478 A | 8/1995 | Lelong et al. |
| 5,451,822 A | 9/1995 | Bechtel et al. |
| 5,457,493 A | 10/1995 | Leddy et al. |
| 5,461,357 A | 10/1995 | Yoshioka et al. |
| 5,461,361 A | 10/1995 | Moore |
| 5,469,298 A | 11/1995 | Suman et al. |

(56) References Cited

U.S. PATENT DOCUMENTS

| | | |
|---|---|---|
| 5,471,515 A | 11/1995 | Fossum et al. |
| 5,475,494 A | 12/1995 | Nishida et al. |
| 5,497,306 A | 3/1996 | Pastrick |
| 5,498,866 A | 3/1996 | Bendicks et al. |
| 5,500,766 A | 3/1996 | Stonecypher |
| 5,510,983 A | 4/1996 | Iino |
| 5,515,448 A | 5/1996 | Nishitani |
| 5,521,633 A | 5/1996 | Nakajima et al. |
| 5,528,698 A | 6/1996 | Kamei et al. |
| 5,529,138 A | 6/1996 | Shaw et al. |
| 5,530,240 A | 6/1996 | Larson et al. |
| 5,530,420 A | 6/1996 | Tsuchiya et al. |
| 5,535,314 A | 7/1996 | Alves et al. |
| 5,537,003 A | 7/1996 | Bechtel et al. |
| 5,539,397 A | 7/1996 | Asanuma et al. |
| 5,541,590 A | 7/1996 | Nishio |
| 5,550,677 A | 8/1996 | Schofield et al. |
| 5,555,555 A | 9/1996 | Sato et al. |
| 5,568,027 A | 10/1996 | Teder |
| 5,574,443 A | 11/1996 | Hsieh |
| 5,581,464 A | 12/1996 | Woll et al. |
| 5,594,222 A | 1/1997 | Caldwell |
| 5,610,756 A | 3/1997 | Lynam et al. |
| 5,614,788 A | 3/1997 | Mullins |
| 5,619,370 A | 4/1997 | Guinosso |
| 5,632,092 A | 5/1997 | Blank et al. |
| 5,634,709 A | 6/1997 | Iwama |
| 5,642,093 A | 6/1997 | Kinoshita et al. |
| 5,642,299 A | 6/1997 | Hardin et al. |
| 5,648,835 A | 7/1997 | Uzawa |
| 5,650,944 A | 7/1997 | Kise |
| 5,660,454 A | 8/1997 | Mori et al. |
| 5,661,303 A | 8/1997 | Teder |
| 5,666,028 A | 9/1997 | Bechtel et al. |
| 5,670,935 A | 9/1997 | Schofield et al. |
| 5,677,851 A | 10/1997 | Kingdon et al. |
| 5,699,044 A | 12/1997 | Van Lente et al. |
| 5,724,316 A | 3/1998 | Brunts |
| 5,732,379 A | 3/1998 | Eckert et al. |
| 5,737,226 A | 4/1998 | Olson et al. |
| 5,760,828 A | 6/1998 | Cortes |
| 5,760,931 A | 6/1998 | Saburi et al. |
| 5,760,962 A | 6/1998 | Schofield et al. |
| 5,761,094 A | 6/1998 | Olson et al. |
| 5,765,116 A | 6/1998 | Wilson-Jones et al. |
| 5,765,118 A | 6/1998 | Fukatani |
| 5,781,437 A | 7/1998 | Wiemer et al. |
| 5,786,772 A | 7/1998 | Schofield et al. |
| 5,790,403 A | 8/1998 | Nakayama |
| 5,790,973 A | 8/1998 | Blaker et al. |
| 5,793,308 A | 8/1998 | Rosinski et al. |
| 5,793,420 A | 8/1998 | Schmidt |
| 5,796,094 A | 8/1998 | Schofield et al. |
| 5,835,255 A | 11/1998 | Miles |
| 5,837,994 A | 11/1998 | Stam et al. |
| 5,844,505 A | 12/1998 | Van Ryzin |
| 5,844,682 A | 12/1998 | Kiyomoto et al. |
| 5,845,000 A | 12/1998 | Breed et al. |
| 5,848,802 A | 12/1998 | Breed et al. |
| 5,850,176 A | 12/1998 | Kinoshita et al. |
| 5,850,254 A | 12/1998 | Takano et al. |
| 5,867,591 A | 2/1999 | Onda |
| 5,877,707 A | 3/1999 | Kowalick |
| 5,877,897 A | 3/1999 | Schofield et al. |
| 5,878,357 A | 3/1999 | Sivashankar et al. |
| 5,878,370 A | 3/1999 | Olson |
| 5,883,739 A | 3/1999 | Ashihara et al. |
| 5,884,212 A | 3/1999 | Lion |
| 5,890,021 A | 3/1999 | Onoda |
| 5,896,085 A | 4/1999 | Mori et al. |
| 5,899,956 A | 5/1999 | Chan |
| 5,915,800 A | 6/1999 | Hiwatashi et al. |
| 5,923,027 A | 7/1999 | Stam et al. |
| 5,924,212 A | 7/1999 | Domanski |
| 5,929,786 A | 7/1999 | Schofield et al. |
| 5,949,331 A | 9/1999 | Schofield et al. |
| 5,959,555 A | 9/1999 | Furuta |
| 5,963,247 A | 10/1999 | Banitt |
| 5,986,796 A | 11/1999 | Miles |
| 5,990,469 A | 11/1999 | Bechtel et al. |
| 5,990,649 A | 11/1999 | Nagao et al. |
| 6,014,601 A | 1/2000 | Gustafson et al. |
| 6,020,704 A | 2/2000 | Buschur |
| 6,049,171 A | 4/2000 | Stam et al. |
| 6,066,933 A | 5/2000 | Ponziana |
| 6,084,519 A | 7/2000 | Coulling et al. |
| 6,097,023 A | 8/2000 | Schofield et al. |
| 6,097,024 A | 8/2000 | Stam et al. |
| 6,100,799 A | 8/2000 | Fenk |
| 6,144,022 A | 11/2000 | Tenenbaum et al. |
| 6,151,539 A | 11/2000 | Bergholz |
| 6,175,300 B1 | 1/2001 | Kendrick |
| 6,178,034 B1 | 1/2001 | Allemand et al. |
| 6,198,409 B1 | 3/2001 | Schofield et al. |
| 6,201,642 B1 | 3/2001 | Bos et al. |
| 6,222,447 B1 | 4/2001 | Schofield et al. |
| 6,223,114 B1 | 4/2001 | Boros et al. |
| 6,227,689 B1 | 5/2001 | Miller |
| 6,250,148 B1 | 6/2001 | Lynam |
| 6,266,082 B1 | 7/2001 | Yonezawa et al. |
| 6,266,442 B1 | 7/2001 | Laumeyer et al. |
| 6,285,393 B1 | 9/2001 | Shimoura et al. |
| 6,294,989 B1 | 9/2001 | Schofield et al. |
| 6,297,781 B1 | 10/2001 | Turnbull et al. |
| 6,302,545 B1 | 10/2001 | Schofield et al. |
| 6,310,611 B1 | 10/2001 | Caldwell |
| 6,313,454 B1 | 11/2001 | Bos et al. |
| 6,317,057 B1 | 11/2001 | Lee |
| 6,320,176 B1 | 11/2001 | Schofield et al. |
| 6,320,282 B1 | 11/2001 | Caldwell |
| 6,333,759 B1 | 12/2001 | Mazzilli |
| 6,341,523 B2 | 1/2002 | Lynam |
| 6,353,392 B1 | 3/2002 | Schofield et al. |
| 6,370,329 B1 | 4/2002 | Teuchert |
| 6,392,315 B1 | 5/2002 | Jones et al. |
| 6,396,397 B1 | 5/2002 | Bos et al. |
| 6,411,204 B1 | 6/2002 | Bloomfield et al. |
| 6,420,975 B1 | 7/2002 | DeLine et al. |
| 6,424,273 B1 | 7/2002 | Gutta et al. |
| 6,430,303 B1 | 8/2002 | Naoi et al. |
| 6,442,465 B2 | 8/2002 | Breed et al. |
| 6,477,464 B2 | 11/2002 | McCarthy et al. |
| 6,497,503 B1 | 12/2002 | Dassanayake et al. |
| 6,498,620 B2 | 12/2002 | Schofield et al. |
| 6,516,664 B2 | 2/2003 | Lynam |
| 6,523,964 B2 | 2/2003 | Schofield et al. |
| 6,534,884 B2 | 3/2003 | Marcus et al. |
| 6,539,306 B2 | 3/2003 | Turnbull |
| 6,547,133 B1 | 4/2003 | DeVries, Jr. et al. |
| 6,553,130 B1 | 4/2003 | Lemelson et al. |
| 6,559,435 B2 | 5/2003 | Schofield et al. |
| 6,574,033 B1 | 6/2003 | Chui et al. |
| 6,589,625 B1 | 7/2003 | Kothari et al. |
| 6,594,583 B2 | 7/2003 | Ogura et al. |
| 6,611,202 B2 | 8/2003 | Schofield et al. |
| 6,611,610 B1 | 8/2003 | Stam et al. |
| 6,636,258 B2 | 10/2003 | Strumolo |
| 6,650,455 B2 | 11/2003 | Miles |
| 6,672,731 B2 | 1/2004 | Schnell et al. |
| 6,674,562 B1 | 1/2004 | Miles |
| 6,678,614 B2 | 1/2004 | McCarthy et al. |
| 6,680,792 B2 | 1/2004 | Miles |
| 6,690,268 B2 | 2/2004 | Schofield et al. |
| 6,700,605 B1 | 3/2004 | Toyoda et al. |
| 6,704,621 B1 | 3/2004 | Stein et al. |
| 6,710,908 B2 | 3/2004 | Miles et al. |
| 6,711,474 B1 | 3/2004 | Treyz et al. |
| 6,714,331 B2 | 3/2004 | Lewis et al. |
| 6,717,610 B1 | 4/2004 | Bos et al. |
| 6,735,506 B2 | 5/2004 | Breed et al. |
| 6,741,377 B2 | 5/2004 | Miles |
| 6,744,353 B2 | 6/2004 | Sjönell |
| 6,757,109 B2 | 6/2004 | Bos |
| 6,762,867 B2 | 7/2004 | Lippert et al. |

(56) References Cited

U.S. PATENT DOCUMENTS

| | | |
|---|---|---|
| 6,794,119 B2 | 9/2004 | Miles |
| 6,795,221 B1 | 9/2004 | Urey |
| 6,802,617 B2 | 10/2004 | Schofield et al. |
| 6,806,452 B2 | 10/2004 | Bos et al. |
| 6,819,231 B2 | 11/2004 | Berberich et al. |
| 6,822,563 B2 | 11/2004 | Bos et al. |
| 6,823,241 B2 | 11/2004 | Shirato et al. |
| 6,824,281 B2 | 11/2004 | Schofield et al. |
| 6,831,261 B2 | 12/2004 | Schofield et al. |
| 6,850,156 B2 | 2/2005 | Bloomfield et al. |
| 6,882,287 B2 | 4/2005 | Schofield |
| 6,889,161 B2 | 5/2005 | Winner et al. |
| 6,891,563 B2 | 5/2005 | Schofield et al. |
| 6,909,753 B2 | 6/2005 | Meehan et al. |
| 6,946,978 B2 | 9/2005 | Schofield |
| 6,953,253 B2 | 10/2005 | Schofield et al. |
| 6,968,736 B2 | 11/2005 | Lynam |
| 6,975,775 B2 | 12/2005 | Rykowski et al. |
| 6,989,736 B2 | 1/2006 | Berberich et al. |
| 7,004,606 B2 | 2/2006 | Schofield |
| 7,005,974 B2 | 2/2006 | McMahon et al. |
| 7,038,577 B2 | 5/2006 | Pawlicki et al. |
| 7,062,300 B1 | 6/2006 | Kim |
| 7,065,432 B2 | 6/2006 | Moisel et al. |
| 7,079,017 B2 | 7/2006 | Lang et al. |
| 7,085,637 B2 | 8/2006 | Breed et al. |
| 7,092,548 B2 | 8/2006 | Laumeyer et al. |
| 7,111,968 B2 | 9/2006 | Bauer et al. |
| 7,116,246 B2 | 10/2006 | Winter et al. |
| 7,123,168 B2 | 10/2006 | Schofield |
| 7,136,753 B2 | 11/2006 | Samukawa et al. |
| 7,145,519 B2 | 12/2006 | Takahashi et al. |
| 7,149,613 B2 | 12/2006 | Stam et al. |
| 7,161,616 B1 | 1/2007 | Okamoto et al. |
| 7,167,796 B2 | 1/2007 | Taylor et al. |
| 7,195,381 B2 | 3/2007 | Lynam et al. |
| 7,202,776 B2 | 4/2007 | Breed |
| 7,205,904 B2 | 4/2007 | Schofield |
| 7,227,459 B2 | 6/2007 | Bos et al. |
| 7,227,611 B2 | 6/2007 | Hull et al. |
| 7,311,406 B2 | 12/2007 | Schofield et al. |
| 7,325,934 B2 | 2/2008 | Schofield et al. |
| 7,325,935 B2 | 2/2008 | Schofield et al. |
| 7,338,177 B2 | 3/2008 | Lynam |
| 7,339,149 B1 | 3/2008 | Schofield et al. |
| 7,344,261 B2 | 3/2008 | Schofield et al. |
| 7,355,524 B2 | 4/2008 | Schofield |
| 7,365,769 B1 | 4/2008 | Mager |
| 7,370,983 B2 | 5/2008 | De Wind et al. |
| 7,380,948 B2 | 6/2008 | Schofield et al. |
| 7,388,182 B2 | 6/2008 | Schofield et al. |
| 7,402,786 B2 | 7/2008 | Schofield et al. |
| 7,423,248 B2 | 9/2008 | Schofield et al. |
| 7,425,076 B2 | 9/2008 | Schofield et al. |
| 7,446,650 B2 | 11/2008 | Schofield et al. |
| 7,459,664 B2 | 12/2008 | Schofield et al. |
| 7,460,951 B2 | 12/2008 | Altan |
| 7,480,149 B2 | 1/2009 | DeWard et al. |
| 7,490,007 B2 | 2/2009 | Taylor et al. |
| 7,492,281 B2 | 2/2009 | Lynam et al. |
| 7,495,550 B2 | 2/2009 | Huang et al. |
| 7,526,103 B2 | 4/2009 | Schofield et al. |
| 7,561,181 B2 | 7/2009 | Schofield et al. |
| 7,581,859 B2 | 9/2009 | Lynam |
| 7,592,928 B2 | 9/2009 | Chinomi et al. |
| 7,616,781 B2 | 11/2009 | Schofield et al. |
| 7,619,508 B2 | 11/2009 | Lynam et al. |
| 7,639,149 B2 | 12/2009 | Katoh |
| 7,681,960 B2 | 3/2010 | Wanke et al. |
| 7,720,580 B2 | 5/2010 | Higgins-Luthman |
| 7,724,962 B2 | 5/2010 | Zhu et al. |
| 7,777,611 B2 | 8/2010 | Desai |
| 7,855,755 B2 | 12/2010 | Weller et al. |
| 7,859,565 B2 | 12/2010 | Schofield et al. |
| 7,881,496 B2 | 2/2011 | Camilleri et al. |
| 7,914,187 B2 | 3/2011 | Higgins-Luthman et al. |
| 7,952,490 B2 | 5/2011 | Fechner et al. |
| 7,965,336 B2 | 6/2011 | Bingle et al. |
| 8,013,780 B2 | 9/2011 | Lynam et al. |
| 8,027,029 B2 | 9/2011 | Lu et al. |
| 8,058,977 B2 | 11/2011 | Lynam |
| 8,340,866 B2 | 12/2012 | Hanzawa et al. |
| 8,520,695 B1 | 8/2013 | Rubin et al. |
| 8,694,224 B2 | 4/2014 | Chundrlik, Jr. et al. |
| 8,775,064 B2 | 7/2014 | Zeng |
| 8,849,495 B2 | 9/2014 | Chundrlik, Jr. et al. |
| 8,861,792 B2 | 10/2014 | Stein et al. |
| 9,327,693 B2 | 5/2016 | Wolf |
| 9,545,921 B2 | 1/2017 | Wolf |
| 2002/0015153 A1 | 2/2002 | Downs |
| 2002/0044065 A1 | 4/2002 | Quist et al. |
| 2002/0113873 A1 | 8/2002 | Williams |
| 2002/0159270 A1 | 10/2002 | Lynam et al. |
| 2003/0137586 A1 | 7/2003 | Lewellen |
| 2003/0222982 A1 | 12/2003 | Hamdan et al. |
| 2003/0227777 A1 | 12/2003 | Schofield |
| 2004/0012488 A1 | 1/2004 | Schofield |
| 2004/0016870 A1 | 1/2004 | Pawlicki et al. |
| 2004/0032321 A1 | 2/2004 | McMahon et al. |
| 2004/0051634 A1 | 3/2004 | Schofield et al. |
| 2004/0114381 A1 | 6/2004 | Salmeen et al. |
| 2004/0128065 A1 | 7/2004 | Taylor et al. |
| 2004/0200948 A1 | 10/2004 | Bos et al. |
| 2005/0078389 A1 | 4/2005 | Kulas et al. |
| 2005/0134966 A1 | 6/2005 | Burgner |
| 2005/0134983 A1 | 6/2005 | Lynam |
| 2005/0146792 A1 | 7/2005 | Schofield et al. |
| 2005/0169003 A1 | 8/2005 | Lindahl et al. |
| 2005/0195488 A1 | 9/2005 | McCabe et al. |
| 2005/0200700 A1 | 9/2005 | Schofield et al. |
| 2005/0232469 A1 | 10/2005 | Schofield et al. |
| 2005/0258977 A1 | 11/2005 | Kiefer |
| 2005/0264891 A1 | 12/2005 | Uken et al. |
| 2006/0018511 A1 | 1/2006 | Stam et al. |
| 2006/0018512 A1 | 1/2006 | Stam et al. |
| 2006/0028731 A1 | 2/2006 | Schofield et al. |
| 2006/0050018 A1 | 3/2006 | Hutzel et al. |
| 2006/0061008 A1 | 3/2006 | Karner et al. |
| 2006/0091813 A1 | 5/2006 | Stam et al. |
| 2006/0103727 A1 | 5/2006 | Tseng |
| 2006/0164221 A1 | 7/2006 | Jensen |
| 2006/0164230 A1 | 7/2006 | DeWind et al. |
| 2006/0250501 A1 | 11/2006 | Wildmann et al. |
| 2006/0290479 A1 | 12/2006 | Akatsuka et al. |
| 2007/0023613 A1 | 2/2007 | Schofield et al. |
| 2007/0104476 A1 | 5/2007 | Yasutomi et al. |
| 2007/0109406 A1 | 5/2007 | Schofield et al. |
| 2007/0109651 A1 | 5/2007 | Schofield et al. |
| 2007/0109652 A1 | 5/2007 | Schofield et al. |
| 2007/0109653 A1 | 5/2007 | Schofield et al. |
| 2007/0109654 A1* | 5/2007 | Schofield ............... B60N 2/002 359/604 |
| 2007/0120657 A1 | 5/2007 | Schofield et al. |
| 2007/0152803 A1 | 7/2007 | Huang et al. |
| 2007/0176080 A1 | 8/2007 | Schofield et al. |
| 2008/0077328 A1 | 3/2008 | Simmons et al. |
| 2008/0180529 A1 | 7/2008 | Taylor et al. |
| 2009/0093938 A1 | 4/2009 | Isaji et al. |
| 2009/0113509 A1 | 4/2009 | Tseng et al. |
| 2009/0177347 A1 | 7/2009 | Breuer et al. |
| 2009/0243824 A1 | 10/2009 | Peterson et al. |
| 2009/0244361 A1 | 10/2009 | Gebauer et al. |
| 2009/0265069 A1 | 10/2009 | Desbrunes |
| 2009/0295181 A1 | 12/2009 | Lawlor et al. |
| 2010/0020170 A1 | 1/2010 | Higgins-Luthman et al. |
| 2010/0045797 A1 | 2/2010 | Schofield et al. |
| 2010/0097469 A1 | 4/2010 | Blank et al. |
| 2010/0228437 A1 | 9/2010 | Hanzawa et al. |
| 2012/0044066 A1 | 2/2012 | Mauderer et al. |
| 2012/0062743 A1 | 3/2012 | Lynam et al. |
| 2012/0101701 A1 | 4/2012 | Moshcuk |
| 2012/0218412 A1* | 8/2012 | Dellantoni ......... G01C 21/3602 348/148 |
| 2012/0245817 A1 | 9/2012 | Cooprider et al. |

(56) References Cited

U.S. PATENT DOCUMENTS

| | | |
|---|---|---|
| 2012/0262340 A1 | 10/2012 | Hassan et al. |
| 2012/0290169 A1 | 11/2012 | Zeng |
| 2012/0303222 A1 | 11/2012 | Cooprider et al. |
| 2012/0316725 A1 | 12/2012 | Trepagnier |
| 2013/0124052 A1 | 5/2013 | Hahne |
| 2013/0129150 A1 | 5/2013 | Saito |
| 2013/0131918 A1 | 5/2013 | Hahne |
| 2013/0166150 A1 | 6/2013 | Han et al. |
| 2013/0231825 A1 | 9/2013 | Chundrlik, Jr. |
| 2013/0278769 A1* | 10/2013 | Nix .................. H04N 7/18 348/148 |
| 2013/0279491 A1 | 10/2013 | Rubin et al. |
| 2013/0321615 A1 | 12/2013 | Schofield |
| 2014/0067206 A1 | 3/2014 | Pflug |
| 2014/0093132 A1 | 4/2014 | Stein et al. |
| 2014/0156157 A1 | 6/2014 | Johnson et al. |
| 2014/0222280 A1 | 8/2014 | Salomonsson |
| 2014/0313339 A1 | 10/2014 | Diessner et al. |
| 2014/0379233 A1 | 12/2014 | Chundrlik, Jr. et al. |

\* cited by examiner

|  | if.. | | |
|---|---|---|---|
|  | dv > 50% | 50% > dv > 30% | dv < 20% |
|  | then set excitation level to.. | | |
| 30m | 0 | 0 | 0 |
| 20m | 1 | 0 | 0 |
| 15m | 2 | 1 | 0 |
| 10m | 3 | 2 | 1 |
| 5m | 4 | 3 | 2 |
| 3m | 4 | 4 | 3 |
| 2m | 4 | 4 | 4 |
| 1,5m | 4 | 4 | 4 |
| 50cm | 4 | 4 | 4 |

Legend dv      delta speed own vehicle to closing vehicle from rear

TABLE 1

FIG. 2

| Excitation Level | Display | Acoustical warning | Pre crash intervention | Speed intervention | Steering intervention | Optical signaling | remote signaling (own car to closing car) |
|---|---|---|---|---|---|---|---|
| 0 | no message | none | none | none | track clearance in front and other lanes | | seek hand shake/ exchange ego speed |
| 1 | showing distance to closing vehicle from the rear | beeping once | none | evtl. start engine, | Compose evasion path(s) | turn on braking lights | seek hand shake, exchange ego speed, exchange ego deceleration rate |
| 2 | showing distance to closing vehicle from the rear flashing | beeping constantly slow tone sequence | none | accelerate moderately | Steering intervention according avoidance path and constantly checking path optimum according clearance situation | flash (direction) indicators in slow (normal) sequence | exchange ego speed, exchange ego deceleration rate, request brake intervention* |
| 3 | showing distance to closing vehicle from the rear massively flashing | beeping constantly rapid tone sequence / loud | bring seats to upright position | accelerate massively | Steering intervention according avoidance path and constantly checking path optimum according clearance situation | flash (direction) indicators in rapid sequence, flash fog light, | exchange ego speed, exchange ego deceleration rate, agree collision avoidance paths, request full brake intervention* |
| 4 | showing distance to closing vehicle from the rear massively flashing | beeping constantly rapid tone sequence / loud | belt tension, adjust or deploy headrest, deploy roll over bar | deploy low(er) gear, accelerate massively | Steering intervention according avoidance path and constantly checking path optimum according clearance situation | indicators in rapid sequence, flash fog light, flash back light | exchange ego speed, exchange ego deceleration rate, agree collision avoidance paths, request full brake intervention* |

*braking of the incoming vehicle

TABLE 2

FIG. 3

COLLISION AVOIDANCE SYSTEM FOR VEHICLE

CROSS REFERENCE TO RELATED APPLICATIONS

The present application is a continuation of U.S. patent application Ser. No. 15/144,114, filed May 2, 2016, now U.S. Pat. No. 9,545,921, which is a continuation of U.S. patent application Ser. No. 14/248,602, filed Apr. 9, 2014, now U.S. Pat. No. 9,327,693, which claims the filing benefits of U.S. provisional application Ser. No. 61/810,407, filed Apr. 10, 2013, which is hereby incorporated herein by reference in its entirety.

FIELD OF THE INVENTION

The present invention relates generally to a vehicle vision system and, more particularly, to a vehicle vision system that utilizes one or more cameras at the vehicle.

BACKGROUND OF THE INVENTION

Use of imaging sensors in vehicle imaging systems is common and known. Examples of such known systems are described in U.S. Pat. Nos. 5,949,331; 5,670,935 and/or 5,550,677, which are hereby incorporated herein by reference in their entireties.

SUMMARY OF THE INVENTION

The present invention provides a collision avoidance system or vision system or imaging system for a vehicle that utilizes one or more cameras (preferably one or more CMOS cameras) to capture image data representative of images exterior of the vehicle, and provides an alert to the driver of the vehicle and/or controls one or more functions or systems of the vehicle responsive to a determination that a rearward approaching vehicle is likely to impact or collide with the subject vehicle.

According to an aspect of the present invention, a collision avoidance system of a vehicle comprises a camera disposed at the equipped vehicle, with the camera having a field of view exterior of and rearward of the equipped vehicle. An image processor is operable to process image data captured by the camera. Responsive to image processing of captured image data, the collision avoidance system is operable to determine an approach of another vehicle rearward of the equipped vehicle and to determine an excitation level depending on (i) a difference between the speed of the approaching vehicle and the speed of the equipped vehicle and (ii) a distance between the approaching vehicle and the equipped vehicle. Responsive to a determined excitation level, the collision avoidance system is operable to at least one of (a) provide an alert to the driver of the equipped vehicle (such as a visible and/or audible alert), (b) provide an alert to the driver of the approaching vehicle (such as via control of one or more exterior lights of the equipped vehicle), (c) prepare the equipped vehicle for impact (such as via pretensioning of the seatbelts worn by the occupant or occupants of the equipped vehicle or via adjusting of the seats or headrests of the equipped vehicle), (d) control a braking system of the equipped vehicle, (e) control a steering system of the equipped vehicle and (f) control an acceleration system of the equipped vehicle. Responsive to a determined excitation level, the collision avoidance system is operable to at least one of (i) provide or transmit or communicate an alert to the driver of the approaching vehicle via a telematics system and (ii) communicate information to the approaching vehicle via a telematics system (such as sharing relative speed and distance information or data and determining respective collision avoidance paths for the equipped vehicle and approaching vehicle).

These and other objects, advantages, purposes and features of the present invention will become apparent upon review of the following specification in conjunction with the drawings.

BRIEF DESCRIPTION OF THE DRAWINGS

FIG. 2 shows Table 1, which shows which 'Excitation Level' may be engaged at which distances respectively to a speed difference; and FIG. 3 shows Table 2, which shows the measures which the system may take at the respective excitation levels shown in Table 1 of FIG. 2.

DESCRIPTION OF THE PREFERRED EMBODIMENTS

Figure 1:
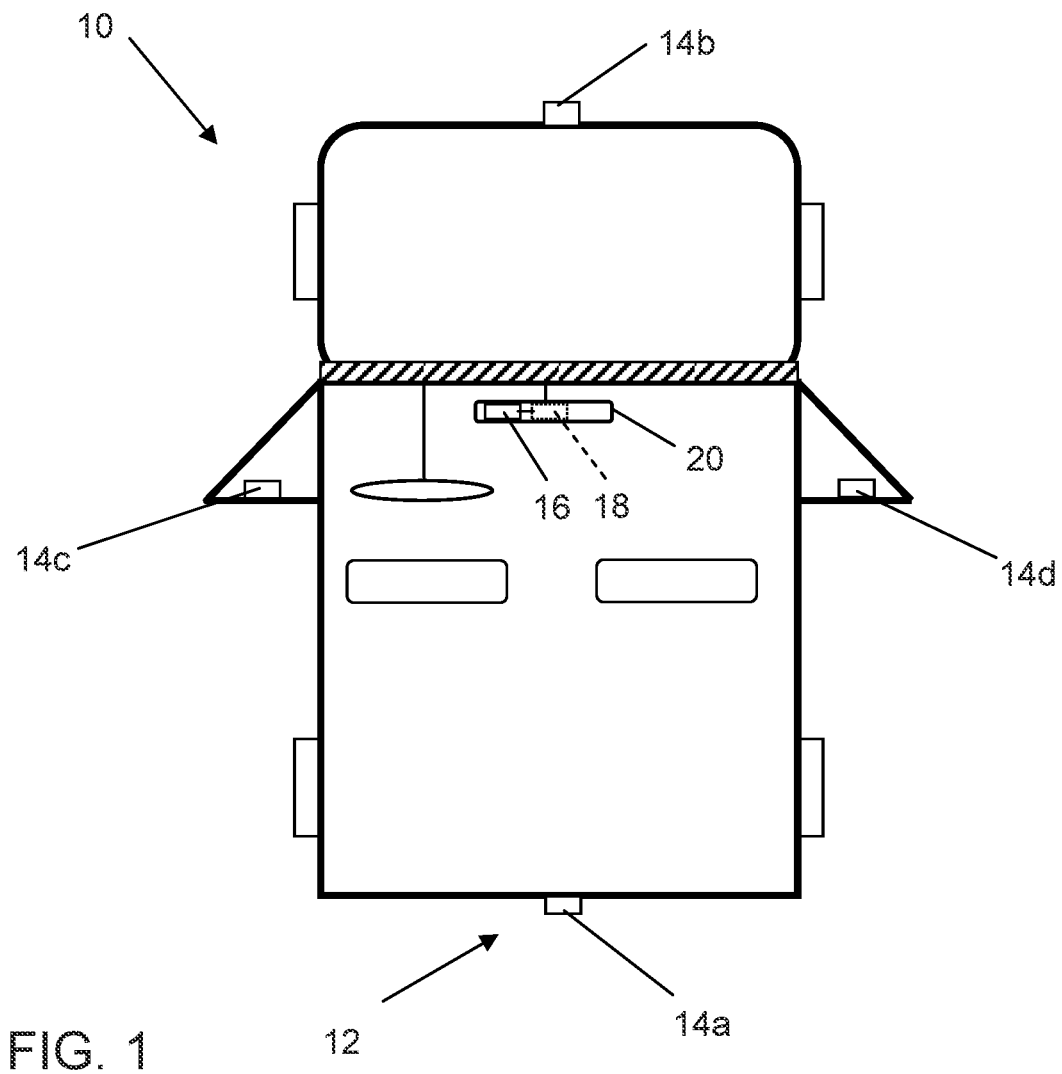
FIG. 1 is a plan view of a vehicle equipped with a collision avoidance system of the present invention.

A vehicle vision system and/or driver assist system and/or object detection system and/or alert system operates to capture images exterior of the vehicle and may process the captured image data to display images and to detect objects at or near the vehicle and in the predicted path of the vehicle, such as to assist a driver of the vehicle in maneuvering the vehicle in a rearward direction. The vision system includes an image processor or image processing system that is operable to receive image data from one or more cameras and provide an output to a display device for displaying images representative of the captured image data. Optionally, the vision system may provide a top down or bird's eye or surround view display and may provide a displayed image that is representative of the subject vehicle, and optionally with the displayed image being customized to at least partially correspond to the actual subject vehicle.

Referring now to the drawings and the illustrative embodiments depicted therein, a vehicle 10 includes an imaging system or vision system 12 that includes at least one exterior facing imaging sensor or camera, such as a rearward facing imaging sensor or camera 14a (and the system may optionally include multiple exterior facing imaging sensors or cameras, such as a forwardly facing camera 14b at the front (or at the windshield) of the vehicle, and a sidewardly/rearwardly facing camera 14c, 14b at respective sides of the vehicle), which captures images exterior of the vehicle, with the camera having a lens for focusing images at or onto an imaging array or imaging plane or imager of the camera (FIG. 1). The vision system 12 includes a control or electronic control unit (ECU) or processor 18 that is operable to process image data captured by the cameras and may provide displayed images at a display device 16 for viewing by the driver of the vehicle (although shown in FIG. 1 as being part of or incorporated in or at an interior rearview mirror assembly 20 of the vehicle, the control and/or the display device may be disposed elsewhere at or in the vehicle). The data transfer or signal communication from the camera to the ECU may comprise any suitable data or communication link, such as a vehicle network bus or the like of the equipped vehicle.

Common systems utilize forward directed sensors to detect vehicles driving in front of the subject or host or equipped vehicle in the same direction and lane. The systems are set up to target a certain distance from the leading vehicle at which they stay during acceleration and deceleration maneuvers of the leading vehicle ahead of the subject vehicle. With such systems, the driver can focus on keeping the host vehicle in its lane. This function is typically referred to as Adaptive Cruise Control (ACC).

Similar systems are provided to interact by warning and braking of the subject or host or equipped vehicle when the driver is driving the vehicle (without following another vehicle in front) towards and closing to a leading vehicle or traffic ahead of the subject vehicle, where the traffic may be standing still or moving much slower than the subject vehicle (such as in a traffic jam or the like). This function is typically referred to as Brake Assist.

These known systems do not provide assistance to a driver of a vehicle that is at the back end of a traffic jam with other vehicles behind the subject vehicle and possibly closing at high speed. In such situations, the driver of the subject vehicle may not notice the rearward approach of another vehicle or may have to hope that the following drivers (or their Brake Assist systems) will brake early enough to come to a stop before a collision or impact with the subject vehicle occurs.

The present invention provides a rear collision warning and assist system that utilizes a rearward facing sensor or camera (and optionally a surround vision system or front and rear vision system, optionally including rear depth and front depth sensors), and optionally utilizing a car2car (v2v) communication system or equipment or the like. Such car2car (v2v)/car2X (v2x) communication systems utilize telematics to enable wireless transmission of data from the equipped host vehicle to another vehicle or car and/or to an infrastructural system (such as a traffic light control system or a traffic management system or the like). Correspondingly, data may be telematically communicated to the host equipped vehicle from other vehicles and/or from an infrastructural system or the like. Such data may comprise the likes of traffic condition data, traffic density data, weather data, road condition data (such as, for example, black ice ahead on the road being travelled) and/or the like.

In accordance with the present invention, the host equipped vehicle may transmit an alert or warning that an immediately following other vehicle is tailgating and/or is in hazard of colliding with the host vehicle, and that warning may be transmitted via a car2car/car2x telematics system to the immediately following (tailgating) other vehicle, in order to (i) alert the driver of that other vehicle to the tailgating/hazardous existing condition and/or (ii) control that other vehicle to mitigate or reduce the tailgating/hazardous condition.

The rear collision warning and assist system of the present invention is operable to determine the difference in speed of the subject vehicle to a closing vehicle that is closing in on or approaching the subject vehicle from rearward of the subject vehicle, and also determines the distance from the subject vehicle to the rearward approaching vehicle. Based on such determinations, the rear collision warning and assist system tracks the incoming or rearward approaching vehicle, and may calculate the deceleration ratio, and estimates whether the incoming or approaching vehicle is likely to be able to come to a stop before reaching the subject vehicle. If, based on such determinations, the system determines that an impact is likely or imminent or unavoidable, the system also determines how high the remaining difference speed at impact would be and how much additional space the rearward approaching vehicle would need for stopping without impacting the subject vehicle. Responsive to such determinations, the rear collision warning and assist system may warn the driver of the subject vehicle of the potentially hazardous situation so that the driver may take appropriate action, or the system may undertake pre-impact measures, such as seat belt pretension and/or adjusting the vehicle seats (such as the occupied seats) to their upright position, and/or the like, and/or the system may control the subject vehicle to accelerate the vehicle automatically to reduce or lower the impact speed and to give the rearward approaching vehicle additional space for braking and slowing/stopping, particularly when there is clearance in front of the subject vehicle.

Optionally, the rear collision warning and assist system may additionally sense or determine the situation at or in neighboring or adjacent lanes at or adjacent to the subject vehicle. The system may intervene and control the subject vehicle (not just via the accelerator) by controlling a steering system or mechanism of the subject vehicle to pull over or move the subject vehicle to another free or unoccupied lane (such as the breakdown lane or the like), such as in situations where the system determines that a rear impact by a rearward approaching vehicle is imminent or otherwise unavoidable. In such situations, the rear collision warning and assist system may utilize collision avoidance path planning methods based on influence mapping, such as by utilizing aspects of the systems described in U.S. patent application Ser. No. 14/016,790, filed Sep. 9, 2013 and published Mar. 6, 2014 as U.S. Publication No. US-2014-0067206, which is hereby incorporated herein by reference in its entirety.

For improving the system's prediction abilities, the rear collision warning and assist system of the present invention may optionally set up and utilize a communication channel that both vehicles (the subject vehicle and the rearward approaching vehicle) may seek and use to exchange vehicle speed and direction data and to determine and agree on collision avoidance paths for both vehicles, such as discussed below.

As shown in Table 1 (FIG. 2), the rear collision warning and assist system may set an excitation level (or degree of hazard rating) responsive to a determination of approach speed (or difference or ratio of the approaching vehicle speed to the subject vehicle speed). Table 1 shows which 'Excitation Level' may be engaged at which distances respectively to the speed difference 'delta v' (dv). Table 2 (FIG. 3) shows the measures which the system may take at the respective excitation levels shown in Table 1.

For example, the columns 'Display', 'Acoustical warning' and 'Optical signaling' in Table 2 may be the basic realization in response to a determination of a rearward approaching vehicle that may be likely to impact the subject or equipped vehicle. For example, a visual alert or display and/or an audible alert or acoustical warning may be provided to alert the driver of the subject vehicle that another vehicle is approaching from the rear, and the degree of the warning may increase (such as more rapid flashing or louder tone or audible signal) as the determined excitation level increases (or as the approaching vehicle gets closer to the subject vehicle and is more likely to impact the subject vehicle). Optionally, an optical signal or alert may be provided to alert drivers of other vehicles (including the driver of the determined rearward approaching vehicle) that the other vehicle is approaching the subject vehicle from the rear and in a potentially unsafe manner, with the degree of the warning (such as different exterior lights of the subject vehicle being activated or flashed, such as activation or flashing of the braking lights, the turn signal indicators, the fog lights, the reversing or backup lights, the headlights and/or the like) increasing as the determined excitation level increases.

Optionally, a 'pre-crash intervention' process may be provided, where the rear collision warning and assist system may, when the excitation level is determined to be relatively high, prepare the vehicle and passengers for impact. For example, and as shown in Table 2, when the excitation level is at 3, the system may bring the seats of the vehicle to an upright position, and when the excitation level is at 4 (which may be indicative of an imminent collision or impact), the system may pretension the seat belt or seat belts and/or may adjust or deploy the headrest or headrests, and/or may deploy a roll over bar or the like.

Optionally, and as also shown in Table 2, the rear collision warning and assist system of the present invention may include a 'speed intervention' process, where the system controls an accelerator or engine/transmission of the subject vehicle to start the engine and/or accelerate moderately or quickly and/or to downshift to a lower gear to enhance acceleration, responsive to the determined excitation level or the degree of the determined hazard. Optionally, and as also shown in Table 2, the rear collision warning and assist system may include a 'steering intervention' process, such as in addition to the 'speed intervention' function, where the system determines the clearance ahead of the subject vehicle and sidewards of the subject vehicle and may determine evasion paths for the subject vehicle, and may control the steering of the subject vehicle to follow a determined avoidance path or evasion path to avoid the rearward collision, responsive to the determined excitation level or the degree of the determined hazard. Such speed and steering intervention may be implemented when the excitation level reaches a threshold level, such as at level 2 or higher in Table 2.

Optionally, and as also shown in Table 2, the rear collision warning and assist system of the present invention may provide a remote signaling function to signal or communicate with a system or systems of the rearward approaching vehicle. For example, the rear collision warning and assist system may have or utilize a car-to-car or v2v communication system (such as by utilizing aspects of the systems described in U.S. provisional applications, Ser. No. 61/912,146, filed Dec. 5, 2013; Ser. No. 61/947,638, filed Mar. 4, 2014; and/or Ser. No. 61/947,053, filed Mar. 3, 2014, which are hereby incorporated herein by reference in their entireties), whereby subject vehicle information or data and approaching vehicle information or data may be exchanged and appropriate measures may be taken to avoid or mitigate the collision or impact. For example, the system may, upon detection of a rearward approaching vehicle, seek a "hand shake" with a system of the approaching vehicle and exchange speed and deceleration rates with the system of the approaching vehicle. As the excitation level (or degree of hazard or potential collision) increases (such as to a threshold level, such as at level 2 or higher in Table 2), the system may request a brake intervention to the approaching vehicle's system to activate or control the brake system of the approaching vehicle, with the requested degree of braking of the approaching vehicle increasing as the hazard or likelihood of impact increases.

Optionally, the systems of the respective vehicles may communicate to determine and agree upon respective collision avoidance paths (where the approaching vehicle may follow a path to one side or the other of the equipped vehicle or where the equipped vehicle may follow a path to one side or the other, such as responsive to a determination of which path or paths for the respective vehicles best avoids the collision of the vehicles), again depending on the determined excitation level or the degree of the determined hazard and depending on the determined available collision avoidance or collision mitigation paths of the vehicles. The systems thus may communicate or transfer vehicle inherent data and intervention coordination strategies via the optional 'remote signaling' function. Optionally, the system or systems may utilize aspects of the systems described in U.S. patent application Ser. No. 14/169,328, filed Jan. 31, 2014, now U.S. Pat. No. 9,092,986, which is hereby incorporated herein by reference in its entirety.

Therefore, the present invention provides a collision avoidance system that is operable to determine the presence of or approach of a rearward vehicle and determine a degree of hazard or likelihood of rear impact of the determined rearward vehicle with respect to the subject or host vehicle. The system may provide a visible and/or audible alert to the driver of the subject vehicle and/or to the driver of the approaching vehicle responsive to a determined degree of hazard or excitation level, and may control one or more systems (such as a braking system and/or steering system and/or acceleration system) of the subject vehicle to avoid or minimize or mitigate the collision or impact, depending on the determined degree of hazard or excitation level. Optionally, the system may communicate with the rearward approaching vehicle to control one or more systems of the approaching vehicle to avoid or minimize or mitigate the collision or impact, depending on the determined degree of hazard or excitation level.

The camera or sensor may comprise any suitable camera or sensor. Optionally, the camera may comprise a "smart camera" that includes the imaging sensor array and associated circuitry and image processing circuitry and electrical connectors and the like as part of a camera module, such as by utilizing aspects of the vision systems described in International Publication Nos. WO 2013/081984 and/or WO 2013/081985, which are hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an EyeQ2 or EyeQ3 image processing chip available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ladar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

For example, the vision system and/or processing and/or camera and/or circuitry may utilize aspects described in U.S. Pat. Nos. 7,005,974; 5,760,962; 5,877,897; 5,796,094; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978; 7,859,565; 5,550,677; 5,670,935; 6,636,258; 7,145,519; 7,161,616; 7,230,640; 7,248,283; 7,295,229; 7,301,466; 7,592,928; 7,881,496; 7,720,580; 7,038,577; 6,882,287; 5,929,786 and/or 5,786,772, and/or International Publication Nos. WO 2011/028686; WO 2010/099416; WO 2012/061567; WO 2012/068331; WO 2012/075250; WO 2012/103193; WO 2012/0116043; WO 2012/0145313; WO 2012/0145501; WO 2012/145818; WO 2012/145822; WO 201 2/1 581 67; WO 2012/075250; WO 2012/0116043; WO 2012/0145501; WO 2012/154919; WO 2013/019707; WO 2013/016409; WO 2013/019795; WO 2013/067083; WO 2013/070539; WO 2013/043661; WO 2013/048994; WO 2013/063014, WO 2013/081984; WO 2013/081985; WO 2013/074604; WO 2013/086249; WO 2013/103548; WO 2013/109869; WO 2013/123161; WO 2013/126715; WO 2013/043661 and/or WO 2013/158592, and/or U.S. patent applications, Ser. No. 14/242,038, filed Apr. 1, 2014 and published Aug. 14, 2014 as U.S. Publication No. US-2014-0226012; Ser. No. 14/229,061, filed Mar. 28, 2014 and published Oct. 2, 2014 as U.S. Publication No. US-2014-0293042; Ser. No. 14/343,937, filed Mar. 10, 2014 and published Aug. 21, 2014 as U.S. Publication No. US-2014-0232872; Ser. No. 14/343,936, filed Mar. 10, 2014 and published Aug. 7, 2014 as U.S. Publication No. US-2014-0218535; Ser. No. 14/195,135, filed Mar. 3, 2014 and published Sep. 4, 2014 as U.S. Publication No. US-2014-0247354; Ser. No. 14/195,136, filed Mar. 3, 2014 and published Sep. 4, 2014 as U.S. Publication No. US-2014-0247355; Ser. No. 14/191,512, filed Feb. 27, 2014 and published Sep. 4, 2014 as U.S. Publication No. US-2014-0247352; Ser. No. 14/183,613, filed Feb. 19, 2014 and published Aug. 21, 2014 as U.S. Publication No. US-2014-0232869; Ser. No. 14/169,329, filed Jan. 31, 2014 and published Aug. 7, 2014 as U.S. Publication No. US-2014-0218529; Ser. No. 14/169,328, filed Jan. 31, 2014, now U.S. Pat. No. 9,092,986; Ser. No. 14/163,325, filed Jan. 24, 2014 and published Jul. 31, 2014 as U.S. Publication No. US-2014-0211009; Ser. No. 14/159,772, filed Jan. 21, 2014, now U.S. Pat. No. 9,068,390; Ser. No. 14/107,624, filed Dec. 16, 2013, now U.S. Pat. No. 9,140,789; Ser. No. 14/102,981, filed Dec. 11, 2013 and published Jun. 12, 2014 as U.S. Publication No. US-2014-0160276; Ser. No. 14/102,980, filed Dec. 11, 2013 and published Jun. 19, 2014 as U.S. Publication No. US-2014-0168437; Ser. No. 14/098,817, filed Dec. 6, 2013 and published Jun. 19, 2014 as U.S. Publication No. US-2014-0168415; Ser. No. 14/097,581, filed Dec. 5, 2013 and published Jun. 12, 2014 as U.S. Publication No. US-2014-0160291; Ser. No. 14/093,981, filed Dec. 2, 2013, now U.S. Pat. No. 8,917,169; Ser. No. 14/093,980, filed Dec. 2, 2013 and published Jun. 5, 2014 as U.S. Publication No. US-2014-0152825; Ser. No. 14/082,573, filed Nov. 18, 2013 and published May 22, 2014 as U.S. Publication No. US-2014-0139676; Ser. No. 14/082,574, filed Nov. 18, 2013, now U.S. Pat. No. 9,307,640; Ser. No. 14/082,575, filed Nov. 18, 2013, now U.S. Pat. No. 9,090,234; Ser. No. 14/082,577, filed Nov. 18, 2013, now U.S. Pat. No. 8,818,042; Ser. No. 14/071,086, filed Nov. 4, 2013, now U.S. Pat. No. 8,886,401; Ser. No. 14/076,524, filed Nov. 11, 2013, now U.S. Pat. No. 9,077,962; Ser. No. 14/052,945, filed Oct. 14, 2013 and published Apr. 17, 2014 as U.S. Publication No. US-2014/0104426; Ser. No. 14/046,174, filed Oct. 4, 2013 and published Apr. 10, 2014 as U.S. Publication No. US-2014/0098229; Ser. No. 14/036,723, filed Sep. 25, 2013 and published Mar. 27, 2014 as U.S. Publication No. US-2014/0085472; Ser. No. 14/016,790, filed Sep. 3, 2013 and published Mar. 6, 2014 as U.S. Publication No. US-2014/0067206; Ser. No. 14/001,272, filed Aug. 23, 2013, now U.S. Pat. No. 9,233,641; Ser. No. 13/970,868, filed Aug. 20, 2013 and published Feb. 20, 2014 as U.S. Publication No. US-2014/0049646; Ser. No. 13/964,134, filed Aug. 12, 2013 and published Feb. 20, 2014 as U.S. Publication No. US-2014/0052340; Ser. No. 13/942,758, filed Jul. 16, 2013 and published Jan. 23, 2014 as U.S. Publication No. 2014/0025240; Ser. No. 13/942,753, filed Jul. 16, 2013 and published Jan. 30, 2014 as U.S. Publication No. 2014/0028852; Ser. No. 13/927,680, filed Jun. 26, 2013 and published Jan. 2, 2014 as U.S. Publication No. 2014/0005907; Ser. No. 13/916,051, filed Jun. 12, 2013 and published Dec. 26, 2013 as U.S. Publication No. 2013/0344736; Ser. No. 13/894,870, filed May 15, 2013 and published Nov. 28, 2013 as U.S. Publication No. 2013/0314503; Ser. No. 13/887,724, filed May 6, 2013 and published Nov. 14, 2013 as U.S. Publication No. 2013/0298866; Ser. No. 13/852,190, filed Mar. 28, 2013 and published Aug. 29, 2013 as U.S. Publication No. US-2013/022593; Ser. No. 13/851,378, filed Mar. 27, 2013 and published Nov. 14, 2013 as U.S. Publication No. 2013/0300869; Ser. No. 13/848,796, filed Mar. 22, 2012 and published Oct. 24, 2013 as U.S. Publication No. 2013/0278769; Ser. No. 13/847,815, filed Mar. 20, 2013 and published Oct. 31, 2013 as U.S. Publication No. 2013/0286193; Ser. No. 13/800,697, filed Mar. 13, 2013 and published Oct. 3, 2013 as U.S. Publication No. 2013/0258077; Ser. No. 13/785,099, filed Mar. 5, 2013 and published Sep. 19, 2013 as U.S. Publication No. 2013/0242099; Ser. No. 13/779,881, filed Feb. 28, 2013 and published Sep. 5, 2013 as U.S. Publication No. 2013/0231825; Ser. No. 13/774,317, filed Feb. 22, 2013 and published Aug. 29, 2013 as U.S. Publication No. 2013/0222592; Ser. No. 13/774,315, filed Feb. 22, 2013 and published Aug. 22, 2013 as U.S. Publication No. 2013/0215271; Ser. No. 13/681,963, filed Nov. 20, 2012 and published Jun. 6, 2013 as U.S. Publication No. 2013/0141578; Ser. No. 13/660,306, filed Oct. 25, 2012 and published May 9, 2013 as U.S. Publication No. 2013/0116859; Ser. No. 13/653,577, filed Oct. 17, 2012 and published Apr. 25, 2013 as U.S. Publication No. 2013/0099908; and/or Ser. No. 13/534,657, filed Jun. 27, 2012 and published Jan. 3, 2013 as U.S. Publication No. US-2013-0002873, and/or U.S. provisional applications, Ser. No. 61/973,922, filed Apr. 2, 2014; Ser. No. 61/972,708, filed Mar. 31, 2014; Ser. No. 61/972,707, filed Mar. 31, 2014; Ser. No. 61/969,474, filed Mar. 24, 2014; Ser. No. 61/955,831, filed Mar. 20, 2014; Ser. No. 61/952,335, filed Mar. 13, 2014; Ser. No. 61/952,334, filed Mar. 13, 2014; Ser. No. 61/950,261, filed Mar. 10, 2014; Ser. No. 61/950,261, filed Mar. 10, 2014; Ser. No. 61/947,638, filed Mar. 4, 2014; Ser. No. 61/947,053, filed Mar. 3, 2014; Ser. No. 61/942,568, filed Feb. 19, 2014; Ser. No. 61/935,485, filed Feb. 4, 2014; Ser. No. 61/935,057, filed Feb. 3, 2014; Ser. No. 61/935,056, filed Feb. 3, 2014; Ser. No. 61/935,055, filed Feb. 3, 2014; Ser. 61/931,811, filed Jan. 27, 2014; Ser. No. 61/919,129, filed Dec. 20, 2013; Ser. No. 61/919,130, filed Dec. 20, 2013; Ser. No. 61/919,131, filed Dec. 20, 2013; Ser. No. 61/919,147, filed Dec. 20, 2013; Ser. No. 61/919,138, filed Dec. 20, 2013, Ser. No. 61/919,133, filed Dec. 20, 2013; Ser. No. 61/918,290, filed Dec. 19, 2013; Ser. No. 61/915,218, filed Dec. 12, 2013; Ser. No. 61/912,146, filed Dec. 5, 2013; Ser. No. 61/911, 666, filed Dec. 4, 2013; Ser. No. 61/911,665, filed Dec. 4, 2013; Ser. No. 61/905,461, filed Nov. 18, 2013; Ser. No. 61/905,462, filed Nov. 18, 2013; Ser. No. 61/901,127, filed Nov. 7, 2013; Ser. No. 61/895,610, filed Oct. 25, 2013; Ser. No. 61/895,609, filed Oct. 25, 2013; Ser. No. 61/879,837, filed Sep. 19, 2013; Ser. No. 61/879,835, filed Sep. 19, 2013; Ser. No. 61/878,877, filed Sep. 17, 2013; Ser. No. 61/875,351, filed Sep. 9, 2013; Ser. No. 61/869,195, filed. Aug. 23, 2013; Ser. No. 61/864,835, filed Aug. 12, 2013; Ser. No. 61/864,836, filed Aug. 12, 2013; Ser. No. 61/864,837, filed Aug. 12, 2013; Ser. No. 61/864,838, filed Aug. 12, 2013; Ser. No. 61/856,843, filed Jul. 22, 2013, Ser. No. 61/845,061, filed Jul. 11, 2013; Ser. No. 61/844,630, filed Jul. 10, 2013; Ser. No. 61/844,173, filed Jul. 9, 2013; Ser. No. 61/844,171, filed Jul. 9, 2013; Ser. No. 61/842,644, filed Jul. 3, 2013; Ser. No. 61/840,542, filed Jun. 28, 2013; Ser. No. 61/838,619, filed Jun. 24, 2013; Ser. No. 61/838,621, filed Jun. 24, 2013; Ser. No. 61/837,955, filed Jun. 21, 2013; Ser. No. 61/836,900, filed Jun. 19, 2013; Ser. No. 61/836,380, filed Jun. 18, 2013; Ser. No. 61/833,080, filed Jun. 10, 2013; Ser. No. 61/830,375, filed Jun. 3, 2013; Ser. No. 61/830,377, filed Jun. 3, 2013; Ser. No. 61/825,752, filed May 21, 2013; Ser. No. 61/825,753, filed May 21, 2013; Ser. No. 61/823,648, filed May 15, 2013; Ser. No. 61/823,644, filed May 15, 2013; Ser. No. 61/821,922, filed May 10, 2013; Ser. No. 61/819,835, filed May 6, 2013; Ser. No. 61/819,033, filed May 3, 2013; Ser. No. 61/816,956, filed Apr. 29, 2013; Ser. No. 61/815,044, filed Apr. 23, 2013; Ser. No. 61/814,533, filed Apr. 22, 2013; and/or Ser. No. 61/813,361, filed Apr. 18, 2013, which are all hereby incorporated herein by reference in their entireties. The system may communicate with other communication systems via any suitable means, such as by utilizing aspects of the systems described in International Publication Nos. WO 2010/144900; WO 2013/043661 and/or WO 2013/081985, and/or U.S. patent application Ser. No. 13/202,005, filed Aug. 17, 2011, now U.S. Pat. No. 9,126,525, which are hereby incorporated herein by reference in their entireties.

The imaging device and control and image processor and any associated illumination source, if applicable, may comprise any suitable components, and may utilize aspects of the cameras and vision systems described in U.S. Pat. Nos. 5,550,677; 5,877,897; 6,498,620; 5,670,935; 5,796,094; 6,396,397; 6,806,452; 6,690,268; 7,005,974; 7,937,667; 7,123,168; 7,004,606; 6,946,978; 7,038,577; 6,353,392; 6,320,176; 6,313,454 and 6,824,281, and/or International Publication Nos. WO 2010/099416; WO 2011/028686 and/or WO 2013/016409, and/or U.S. patent application Ser. No. 12/508,840, filed Jul. 24, 2009 and published Jan. 28, 2010 as U.S. Pat. Publication No. US-2010-0020170, and/or U.S. patent application Ser. No. 13/534,657, filed Jun. 27, 2012 and published Jan. 3, 2013 as U.S. Publication No. US-2013-0002873, which are all hereby incorporated herein by reference in their entireties. The camera or cameras may comprise any suitable cameras or imaging sensors or camera modules, and may utilize aspects of the cameras or sensors described in U.S. patent applications, Ser. No. 12/091,359, filed Apr. 24, 2008 and published Oct. 1, 2009 as U.S. Publication No. US-2009-0244361; and/or Ser. No. 13/260,400, filed Sep. 26, 2011, now U.S. Pat. No. 8,542,451, and/or U.S. Pat. Nos. 7,965,336 and/or 7,480,149, which are hereby incorporated herein by reference in their entireties. The imaging array sensor may comprise any suitable sensor, and may utilize various imaging sensors or imaging array sensors or cameras or the like, such as a CMOS imaging array sensor, a CCD sensor or other sensors or the like, such as the types described in U.S. Pat. Nos. 5,550,677; 5,670,935; 5,760,962; 5,715,093; 5,877,897; 6,922,292; 6,757,109; 6,717,610; 6,590,719; 6,201,642; 6,498,620; 5,796,094; 6,097,023; 6,320,176; 6,559,435; 6,831,261; 6,806,452; 6,396,397; 6,822,563; 6,946,978; 7,339,149; 7,038,577; 7,004,606; 7,720,580 and/or 7,965,336, and/or International Publication Nos. WO 2009/036176 and/or WO 2009/046268, which are all hereby incorporated herein by reference in their entireties.

The camera module and circuit chip or board and imaging sensor may be implemented and operated in connection with various vehicular vision-based systems, and/or may be operable utilizing the principles of such other vehicular systems, such as a vehicle headlamp control system, such as the type disclosed in U.S. Pat. Nos. 5,796,094; 6,097,023; 6,320,176; 6,559,435; 6,831,261; 7,004,606; 7,339,149 and/or 7,526,103, which are all hereby incorporated herein by reference in their entireties, a rain sensor, such as the types disclosed in commonly assigned U.S. Pat. Nos. 6,353,392; 6,313,454; 6,320,176 and/or 7,480,149, which are hereby incorporated herein by reference in their entireties, a vehicle vision system, such as a forwardly, sidewardly or rearwardly directed vehicle vision system utilizing principles disclosed in U.S. Pat. Nos. 5,550,677; 5,670,935; 5,760,962; 5,877,897; 5,949,331; 6,222,447; 6,302,545; 6,396,397; 6,498,620; 6,523,964; 6,611,202; 6,201,642; 6,690,268; 6,717,610; 6,757,109; 6,802,617; 6,806,452; 6,822,563; 6,891,563; 6,946,978 and/or 7,859,565, which are all hereby incorporated herein by reference in their entireties, a trailer hitching aid or tow check system, such as the type disclosed in U.S. Pat. No. 7,005,974, which is hereby incorporated herein by reference in its entirety, a reverse or sideward imaging system, such as for a lane change assistance system or lane departure warning system or for a blind spot or object detection system, such as imaging or detection systems of the types disclosed in U.S. Pat. Nos. 7,720,580; 7,038,577; 5,929,786 and/or 5,786,772, and/or U.S. pat. application Ser. No. 11/239,980, filed Sep. 30, 2005, now U.S. Pat. No. 7,881,496, and/or U.S. provisional applications, Ser. No. 60/628,709, filed Nov. 17, 2004; Ser. No. 60/614,644, filed Sep. 30, 2004; Ser. No. 60/618,686, filed Oct. 14, 2004; Ser. No. 60/638,687, filed Dec. 23, 2004, which are hereby incorporated herein by reference in their entireties, a video device for internal cabin surveillance and/or video telephone function, such as disclosed in U.S. Pat. Nos. 5,760,962; 5,877,897; 6,690,268 and/or 7,370,983, and/or U.S. Publication No. US-2006-0050018, which are hereby incorporated herein by reference in their entireties, a traffic sign recognition system, a system for determining a distance to a leading or trailing vehicle or object, such as a system utilizing the principles disclosed in U.S. Pat. Nos. 6,396,397 and/or 7,123,168, which are hereby incorporated herein by reference in their entireties, and/or the like.

Optionally, the circuit board or chip may include circuitry for the imaging array sensor and or other electronic accessories or features, such as by utilizing compass-on-a-chip or EC driver-on-a-chip technology and aspects such as described in U.S. Pat. No. 7,255,451 and/or U.S. Pat. No. 7,480,149; and/or U.S. Publication No. US-2006-0061008 and/or U.S. patent application Ser. No. 12/578,732, filed Oct. 14, 2009 and published Apr. 22, 2010 as U.S. Publication No. US-2010-0097469, which are hereby incorporated herein by reference in their entireties.

Optionally, the vision system may include a display for displaying images captured by one or more of the imaging sensors for viewing by the driver of the vehicle while the driver is normally operating the vehicle. Optionally, for example, the vision system may include a video display device disposed at or in the interior rearview mirror assembly of the vehicle, such as by utilizing aspects of the video mirror display systems described in U.S. Pat. No. 6,690,268 and/or U.S. patent application Ser. No. 13/333,337, filed Dec. 21, 2011, now U.S. Pat. No. 9,264,672, which are hereby incorporated herein by reference in their entireties. The video mirror display may comprise any suitable devices and systems and optionally may utilize aspects of the compass display systems described in U.S. Pat. Nos. 7,370,983; 7,329,013; 7,308,341; 7,289,037; 7,249,860; 7,004,593; 4,546,551; 5,699,044; 4,953,305; 5,576,687; 5,632,092; 5,677,851; 5,708,410; 5,737,226; 5,802,727; 5,878,370; 6,087,953; 6,173,508; 6,222,460; 6,513,252 and/or 6,642,851, and/or European patent application, published Oct. 11, 2000 under Publication No. EP 0 1043566, and/or U.S. Publication No. US-2006-0061008, which are all hereby incorporated herein by reference in their entireties. Optionally, the video mirror display screen or device may be operable to display images captured by a rearward viewing camera of the vehicle during a reversing maneuver of the vehicle (such as responsive to the vehicle gear actuator being placed in a reverse gear position or the like) to assist the driver in backing up the vehicle, and optionally may be operable to display the compass heading or directional heading character or icon when the vehicle is not undertaking a reversing maneuver, such as when the vehicle is being driven in a forward direction along a road (such as by utilizing aspects of the display system described in International Publication No. WO 2012/051500, which is hereby incorporated herein by reference in its entirety).

Optionally, the vision system (utilizing the forward facing camera and a rearward facing camera and other cameras disposed at the vehicle with exterior fields of view) may be part of or may provide a display of a top-down view or birds-eye view system of the vehicle or a surround view at the vehicle, such as by utilizing aspects of the vision systems described in International Publication Nos. WO 2010/099416; WO 2011/028686; WO 2012/075250; WO 2013/019795; WO 2012/075250; WO 2012/145822; WO 2013/081985; WO 2013/086249 and/or WO 2013/109869, and/or U.S. patent application Ser. No. 13/333,337, filed Dec. 21, 2011, now U.S. Pat. No. 9,264,672, which are hereby incorporated herein by reference in their entireties.

Optionally, a video mirror display may be disposed rearward of and behind the reflective element assembly and may comprise a display such as the types disclosed in U.S. Pat. Nos. 5,530,240; 6,329,925; 7,855,755; 7,626,749; 7,581,859; 7,446,650; 7,370,983; 7,338,177; 7,274,501; 7,255,451; 7,195,381; 7,184,190; 5,668,663; 5,724,187 and/or 6,690,268, and/or in U.S. Publication Nos. US-2006-0061008 and/or US-2006-0050018, which are all hereby incorporated herein by reference in their entireties. The display is viewable through the reflective element when the display is activated to display information. The display element may be any type of display element, such as a vacuum fluorescent (VF) display element, a light emitting diode (LED) display element, such as an organic light emitting diode (OLED) or an inorganic light emitting diode, an electroluminescent (EL) display element, a liquid crystal display (LCD) element, a video screen display element or backlit thin film transistor (TFT) display element or the like, and may be operable to display various information (as discrete characters, icons or the like, or in a multi-pixel manner) to the driver of the vehicle, such as passenger side inflatable restraint (PSIR) information, tire pressure status, and/or the like. The mirror assembly and/or display may utilize aspects described in U.S. Pat. Nos. 7,184,190; 7,255,451; 7,446,924 and/or 7,338,177, which are all hereby incorporated herein by reference in their entireties. The thicknesses and materials of the coatings on the substrates of the reflective element may be selected to provide a desired color or tint to the mirror reflective element, such as a blue colored reflector, such as is known in the art and such as described in U.S. Pat. Nos. 5,910,854; 6,420,036 and/or 7,274,501, which are hereby incorporated herein by reference in their entireties.

Optionally, the display or displays and any associated user inputs may be associated with various accessories or systems, such as, for example, a tire pressure monitoring system or a passenger air bag status or a garage door opening system or a telematics system or any other accessory or system of the mirror assembly or of the vehicle or of an accessory module or console of the vehicle, such as an accessory module or console of the types described in U.S. Pat. Nos. 7,289,037; 6,877,888; 6,824,281; 6,690,268; 6,672,744; 6,386,742 and/or 6,124,886, and/or U.S. Publication No. US-2006-0050018, which are hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:
1. A collision avoidance system suitable for use in a vehicle, said collision avoidance system comprising:
a forward-viewing camera disposed at a vehicle equipped with said collision avoidance system, said forward-viewing camera having a field of view forward of the equipped vehicle;
wherein the field of view of said forward-viewing camera at least encompasses (i) a traffic lane the equipped vehicle is driving in and (ii) an adjacent traffic lane that is adjacent to the traffic lane the equipped vehicle is driving in;
a first image processor operable to process image data captured by said forward-viewing camera;
wherein, responsive at least in part to image processing by said first image processor of image data captured by said forward-viewing camera, said collision avoidance system detects the presence of vehicles present ahead of the equipped vehicle;
wherein, responsive at least in part to image processing by said first image processor of image data captured by said forward-viewing camera, said collision avoidance system is operable to determine a detected vehicle to be present in the traffic lane the equipped vehicle is driving in;

wherein, responsive at least in part to image processing by said first image processor of image data captured by said forward-viewing camera, said collision avoidance system is operable to determine a detected vehicle to be present in an adjacent traffic lane that is adjacent to the traffic lane the equipped vehicle is driving in;

a plurality of other sensors disposed at the equipped vehicle;

wherein said plurality of other sensors sense at least forwardly and sidewardly of the equipped vehicle;

wherein said plurality of other sensors capture sensor data;

a rearward-viewing camera disposed at the equipped vehicle, said rearward-viewing camera having a field of view rearward of the equipped vehicle;

wherein the field of view of said rearward-viewing camera encompasses (i) the traffic lane the equipped vehicle is driving in and (ii) an adjacent traffic lane that is adjacent to the traffic lane the equipped vehicle is driving in;

a second image processor operable to process image data captured by said rearward-viewing camera;

wherein, responsive at least in part to image processing by said second image processor of image data captured by said rearward-viewing camera, said collision avoidance system detects the presence of vehicles present rearward of the equipped vehicle;

wherein, responsive at least in part to image processing by said second image processor of image data captured by said rearward-viewing camera, said collision avoidance system is operable to determine a detected vehicle to be present in the traffic lane the equipped vehicle is driving in;

wherein, responsive at least in part to image processing by said second image processor of image data captured by said rearward-viewing camera, said collision avoidance system is operable to determine a detected vehicle to be present in an adjacent traffic lane that is adjacent to the traffic lane the equipped vehicle is driving in;

wherein information relating to other vehicles present exterior the equipped vehicle is wirelessly transmitted to the equipped vehicle via a car2car (v2v) communication system;

wherein information relating to the equipped vehicle is wirelessly transmitted to other vehicles present exterior the equipped vehicle via the car2car (v2v) communication system; and wherein, responsive at least in part to at least one of (i) image processing by said first image processor of image data captured by said forward-viewing camera, (ii) image processing by said second image processor of image data captured by said rearward-viewing camera, (iii) radar data sensed by at least one radar sensor of said plurality of other sensors, (iv) lidar data sensed by at least one lidar sensor of said plurality of other sensors and (v) information transmitted to or from the equipped vehicle via the car2car (v2v) communication system, said collision avoidance system is operable to determine imminence of collision with the equipped vehicle by another vehicle present exterior the equipped vehicle.

2. The collision avoidance system of claim 1, wherein the other vehicle present exterior the equipped vehicle comprises an immediately following other vehicle.

3. The collision avoidance system of claim 2, wherein the immediately following other vehicle is tailgating the equipped vehicle.

4. The collision avoidance system of claim 1, wherein, responsive at least in part to information transmitted to or from the equipped vehicle via the car2car (v2v) communication system, a braking system of the equipped vehicle is controlled.

5. The collision avoidance system of claim 4, wherein, responsive at least in part to information transmitted to or from the equipped vehicle via the car2car (v2v) communication system, a steering system of the equipped vehicle is controlled.

6. The collision avoidance system of claim 1, wherein said collision avoidance system determines (i) a difference between the speed of an approaching vehicle and the speed of the equipped vehicle and (ii) a distance between the approaching vehicle and the equipped vehicle, and wherein, responsive at least in part to a difference between the speed of the approaching vehicle and the speed of the equipped vehicle being such that a collision is imminent, said collision avoidance system prepares the equipped vehicle for collision.

7. The collision avoidance system of claim 6, wherein said collision avoidance system prepares the equipped vehicle for collision by pretensioning a seat belt of the equipped vehicle.

8. The collision avoidance system of claim 7, wherein said collision avoidance system prepares the equipped vehicle for collision by adjusting a seat of the equipped vehicle.

9. The collision avoidance system of claim 6, wherein said collision avoidance system is operable to wirelessly communicate via the car2car (v2v) communication system to the approaching vehicle a request to control a vehicle system of the approaching vehicle.

10. The collision avoidance system of claim 9, wherein said vehicle system of the approaching vehicle comprises a brake system of the approaching vehicle.

11. The collision avoidance system of claim 1, wherein said collision avoidance system is operable to communicate via the car2car (v2v) communication system with the other vehicle present exterior the equipped vehicle to determine respective collision avoidance paths for the vehicles.

12. The collision avoidance system of claim 1, wherein said collision avoidance system is operable, responsive at least in part to a communication wirelessly communicated to the equipped vehicle via the car2car (v2v) communication system to at least one of (a) control a braking system of the equipped vehicle, (b) control a steering system of the equipped vehicle and (c) control an acceleration system of the equipped vehicle.

13. The collision avoidance system of claim 1, wherein said forward-viewing camera is a component of an adaptive cruise control system of the equipped vehicle.

14. The collision avoidance system of claim 1, wherein, responsive at least in part to determination by said collision avoidance system of imminence of collision with the equipped vehicle by the other vehicle present exterior the equipped vehicle, said collision avoidance system determines an evasive path to avoid collision with the other vehicle.

15. The collision avoidance system of claim 14, wherein said collision avoidance system controls a steering system of the equipped vehicle to move the equipped vehicle along the determined evasive path.

16. The collision avoidance system of claim 15, wherein said collision avoidance system controls the steering system of the equipped vehicle to move the equipped vehicle into an adjacent traffic lane that is adjacent to the traffic lane the equipped vehicle is driving in.

17. The collision avoidance system of claim 1, wherein said first image processor and said second image processor comprise a common image processor.

18. The collision avoidance system of claim 17, wherein, responsive at least in part to information transmitted to or from the equipped vehicle via the car2car (v2v) communication system, and responsive at least in part to at least one of (i) image processing by said common image processor of image data captured by said forward-viewing camera and (ii) image processing by said common image processor of image data captured by said rearward-viewing camera, said collision avoidance system is operable to determine imminence of collision with the equipped vehicle by another vehicle present exterior the equipped vehicle.

19. The collision avoidance system of claim 18, wherein, responsive at least in part to at least one of (i) radar data sensed by at least one radar sensor of said plurality of other sensors and (ii) lidar data sensed by at least one lidar sensor of said plurality of other sensors, said collision avoidance system is operable to determine imminence of collision with the equipped vehicle by another vehicle present exterior the equipped vehicle.

20. A collision avoidance system suitable for use in a vehicle, said collision avoidance system comprising:
a forward-viewing camera disposed at a vehicle equipped with said collision avoidance system, said forward-viewing camera having a field of view forward of the equipped vehicle;
wherein the field of view of said forward-viewing camera at least encompasses (i) a traffic lane the equipped vehicle is driving in and (ii) an adjacent traffic lane that is adjacent to the traffic lane the equipped vehicle is driving in;
an image processor operable to process image data captured by said forward-viewing camera;
wherein, responsive at least in part to image processing by said image processor of image data captured by said forward-viewing camera, said collision avoidance system detects the presence of vehicles present ahead of the equipped vehicle;
wherein, responsive at least in part to image processing by said image processor of image data captured by said forward-viewing camera, said collision avoidance system is operable to determine a detected vehicle to be present in the traffic lane the equipped vehicle is driving in;
wherein, responsive at least in part to image processing by said image processor of image data captured by said forward-viewing camera, said collision avoidance system is operable to determine a detected vehicle to be present in an adjacent traffic lane that is adjacent to the traffic lane the equipped vehicle is driving in;
a plurality of other sensors disposed at the equipped vehicle;
wherein said plurality of other sensors sense at least forwardly and sidewardly of the equipped vehicle;
wherein said plurality of other sensors capture sensor data;
a rearward-viewing camera disposed at the equipped vehicle, said rearward-viewing camera having a field of view rearward of the equipped vehicle;
wherein the field of view of said rearward-viewing camera encompasses (i) the traffic lane the equipped vehicle is driving in and (ii) an adjacent traffic lane that is adjacent to the traffic lane the equipped vehicle is driving in;
wherein said image processor is operable to process image data captured by said rearward-viewing camera;
wherein, responsive at least in part to image processing by said image processor of image data captured by said rearward-viewing camera, said collision avoidance system detects the presence of vehicles present rearward of the equipped vehicle;
wherein, responsive at least in part to image processing by said image processor of image data captured by said rearward-viewing camera, said collision avoidance system is operable to determine a detected vehicle to be present in the traffic lane the equipped vehicle is driving in;
wherein, responsive at least in part to image processing by said image processor of image data captured by said rearward-viewing camera, said collision avoidance system is operable to determine a detected vehicle to be present in an adjacent traffic lane that is adjacent to the traffic lane the equipped vehicle is driving in;
wherein information relating to other vehicles present exterior the equipped vehicle is wirelessly transmitted to the equipped vehicle via a car2car (v2v) communication system;
wherein information relating to the equipped vehicle is wirelessly transmitted to other vehicles present exterior the equipped vehicle via the car2car (v2v) communication system;
wherein, responsive at least in part to at least one of (i) image processing by said image processor of image data captured by said forward-viewing camera, (ii) image processing by said image processor of image data captured by said rearward-viewing camera, (iii) sensor data sensed by said plurality of other sensors and (iv) information transmitted to or from the equipped vehicle via the car2car (v2v) communication system, said collision avoidance system is operable to determine imminence of collision with the equipped vehicle by another vehicle present exterior the equipped vehicle;
wherein the other vehicle present exterior the equipped vehicle comprises one of (i) a following other vehicle rearward of the equipped vehicle and (ii) an approaching other vehicle forward of the equipped vehicle;
wherein, responsive at least in part to determination by said collision avoidance system of imminence of collision with the equipped vehicle by the other vehicle present exterior the equipped vehicle, said collision avoidance system determines an evasive path to avoid collision with the other vehicle; and
wherein said collision avoidance system controls a steering system of the equipped vehicle to move the equipped vehicle along the determined evasive path.

21. The collision avoidance system of claim 20, wherein, responsive at least in part to information transmitted to or from the equipped vehicle via the car2car (v2v) communication system, a braking system of the equipped vehicle is controlled.

22. The collision avoidance system of claim 20, wherein, responsive at least in part to information transmitted to or from the equipped vehicle via the car2car (v2v) communication system, a steering system of the equipped vehicle is controlled.

23. The collision avoidance system of claim 20, wherein said collision avoidance system is operable to wirelessly communicate via the car2car (v2v) communication system to the other vehicle a request to control a vehicle system of the other vehicle.

24. The collision avoidance system of claim 23, wherein said vehicle system of the other vehicle comprises a brake system of the other vehicle.

25. The collision avoidance system of claim 20, wherein said collision avoidance system is operable to communicate via the car2car (v2v) communication system with the other vehicle present exterior the equipped vehicle to determine respective collision avoidance paths for the vehicles.

26. The collision avoidance system of claim 20, wherein said collision avoidance system is operable, responsive at least in part to communication wirelessly communicated to the equipped vehicle via the car2car (v2v) communication system, to at least one of (a) control a braking system of the equipped vehicle, (b) control a steering system of the equipped vehicle and (c) control an acceleration system of the equipped vehicle.

27. The collision avoidance system of claim 26, wherein said forward-viewing camera is a component of an adaptive cruise control system of the equipped vehicle.

28. The collision avoidance system of claim 26, wherein the equipped vehicle and the other vehicle present exterior the equipped vehicle exchange vehicle speed and direction data via the car2car (v2v) communication system.

29. The collision avoidance system of claim 20, wherein the equipped vehicle and the other vehicle present exterior the equipped vehicle exchange vehicle data via the car2car (v2v) communication system, and wherein, responsive at least in part to exchanged vehicle data wirelessly communicated via the car2car (v2v) communication system, the equipped vehicle and the other vehicle present exterior the equipped vehicle each determine respective collision avoidance paths.

30. The collision avoidance system of claim 29, wherein said plurality of other sensors comprises at least one radar sensor.

31. The collision avoidance system of claim 30, wherein said plurality of other sensors comprises at least one lidar sensor.

32. A collision avoidance system suitable for use in a vehicle, said collision avoidance system comprising:
a forward-viewing camera disposed at a vehicle equipped with said collision avoidance system, said forward-viewing camera having a field of view forward of the equipped vehicle;
wherein the field of view of said forward-viewing camera at least encompasses (i) a traffic lane the equipped vehicle is driving in and (ii) an adjacent traffic lane that is adjacent to the traffic lane the equipped vehicle is driving in;
an image processor operable to process image data captured by said forward-viewing camera;
wherein, responsive at least in part to image processing by said image processor of image data captured by said forward-viewing camera, said collision avoidance system detects the presence of vehicles present ahead of the equipped vehicle;
wherein, responsive at least in part to image processing by said image processor of image data captured by said forward-viewing camera, said collision avoidance system is operable to determine a detected vehicle to be present in the traffic lane the equipped vehicle is driving in;
wherein, responsive at least in part to image processing by said image processor of image data captured by said forward-viewing camera, said collision avoidance system is operable to determine a detected vehicle to be present in an adjacent traffic lane that is adjacent to the traffic lane the equipped vehicle is driving in;
a plurality of other sensors disposed at the equipped vehicle;
wherein said plurality of other sensors sense at least forwardly and sidewardly of the equipped vehicle;
wherein said plurality of other sensors capture sensor data;
a rearward-viewing camera disposed at the equipped vehicle, said rearward-viewing camera having a field of view rearward of the equipped vehicle;
wherein the field of view of said rearward-viewing camera encompasses (i) the traffic lane the equipped vehicle is driving in and (ii) an adjacent traffic lane that is adjacent to the traffic lane the equipped vehicle is driving in;
wherein said image processor is operable to process image data captured by said rearward-viewing camera;
wherein, responsive at least in part to image processing by said image processor of image data captured by said rearward-viewing camera, said collision avoidance system detects the presence of vehicles present rearward of the equipped vehicle;
wherein, responsive at least in part to image processing by said image processor of image data captured by said rearward-viewing camera, said collision avoidance system is operable to determine a detected vehicle to be present in the traffic lane the equipped vehicle is driving in;
wherein, responsive at least in part to image processing by said image processor of image data captured by said rearward-viewing camera, said collision avoidance system is operable to determine a detected vehicle to be present in an adjacent traffic lane that is adjacent to the traffic lane the equipped vehicle is driving in;
wherein information relating to other vehicles present exterior the equipped vehicle is wirelessly transmitted to the equipped vehicle via a car2car (v2v) communication system;
wherein information relating to the equipped vehicle is wirelessly transmitted to other vehicles present exterior the equipped vehicle via the car2car (v2v) communication system;
wherein, responsive at least in part to at least one of (i) image processing by said image processor of image data captured by said forward-viewing camera, (ii) image processing by said image processor of image data captured by said rearward-viewing camera, (iii) sensor data sensed by said plurality of other sensors and (iv) information transmitted to or from the equipped vehicle via the car2car (v2v) communication system, said collision avoidance system is operable to determine imminence of collision with the equipped vehicle by another vehicle present exterior the equipped vehicle;
wherein the equipped vehicle and the other vehicle present exterior the equipped vehicle exchange vehicle data via the car2car (v2v) communication system; and
wherein, responsive at least in part to exchanged vehicle data wirelessly communicated via the car2car (v2v) communication system, the equipped vehicle and the other vehicle present exterior the equipped vehicle each determine respective collision avoidance paths.

33. The collision avoidance system of claim 32, wherein the equipped vehicle and the other vehicle present exterior the equipped vehicle exchange vehicle speed and direction data via the car2car (v2v) communication system.

34. The collision avoidance system of claim 33, wherein said forward-viewing camera is a component of an adaptive cruise control system of the equipped vehicle.

35. The collision avoidance system of claim 33, wherein, responsive at least in part to information transmitted to or from the equipped vehicle via the car2car (v2v) communication system, a braking system of the equipped vehicle is controlled.

36. The collision avoidance system of claim 35, wherein, responsive at least in part to information transmitted to or from the equipped vehicle via the car2car (v2v) communication system, a steering system of the equipped vehicle is controlled.

37. The collision avoidance system of claim 32, wherein said collision avoidance system is operable to wirelessly communicate via the car2car (v2v) communication system to the other vehicle a request to control a vehicle system of the other vehicle.

38. The collision avoidance system of claim 37, wherein said vehicle system of the other vehicle comprises a brake system of the other vehicle.

39. The collision avoidance system of claim 32, wherein said collision avoidance system is operable, responsive at least in part to communication wirelessly communicated to the equipped vehicle via the car2car (v2v) communication system, to at least one of (a) control a braking system of the equipped vehicle, (b) control a steering system of the equipped vehicle and (c) control an acceleration system of the equipped vehicle.

40. The collision avoidance system of claim 39, wherein said plurality of other sensors comprises at least one radar sensor.

41. The collision avoidance system of claim 40, wherein said plurality of other sensors comprises at least one lidar sensor.

42. The collision avoidance system of claim 32, wherein, responsive at least in part to determination by said collision avoidance system of imminence of collision with the equipped vehicle by the other vehicle present exterior the equipped vehicle, said collision avoidance system determines an evasive path to avoid collision with the other vehicle.

43. The collision avoidance system of claim 42, wherein said collision avoidance system controls a steering system of the equipped vehicle to move the equipped vehicle along the determined evasive path.

* * * * *